United States Patent
Cao et al.

(10) Patent No.: US 9,712,374 B1
(45) Date of Patent: Jul. 18, 2017

(54) NETWORK SERVICES RESOURCE MANAGEMENT

(75) Inventors: Wei Cao, San Jose, CA (US); Xia Zhu, Beijing (CN); Xuejun Wu, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 1872 days.

(21) Appl. No.: 12/859,090

(22) Filed: Aug. 18, 2010

(51) Int. Cl.
*G06F 15/16* (2006.01)
*H04L 29/08* (2006.01)

(52) U.S. Cl.
CPC .. *H04L 29/08072* (2013.01); *H04L 29/08135* (2013.01)

(58) Field of Classification Search
USPC .......................................................... 709/200
See application file for complete search history.

(56) References Cited

U.S. PATENT DOCUMENTS

| 7,546,371 | B1 | 6/2009 | Cheng et al. | |
|---|---|---|---|---|
| 2003/0204603 | A1* | 10/2003 | Buchanan et al. | 709/228 |
| 2006/0248582 | A1* | 11/2006 | Panjwani et al. | 726/13 |
| 2008/0298366 | A1* | 12/2008 | Appiah et al. | 370/392 |
| 2009/0109849 | A1* | 4/2009 | Wood et al. | 370/235 |

* cited by examiner

*Primary Examiner* — Alan S Chou
(74) *Attorney, Agent, or Firm* — Shumaker & Sieffert, P.A.

(57) ABSTRACT

In general, the invention is directed to techniques for scheduling resource access within an intermediate network device. For example, as described herein, a device receives packets for a plurality of sessions that include application-layer data for the sessions. The device determines a weight for each of the plurality of sessions and, during periods of resource congestion, selects one or more sessions for additional resource allocation based on the respective weights of the sessions. The device allocates additional memory resources to selected sessions to enable further buffering of application-layer data such that the device may apply the service to multiple sessions concurrently despite the resource congestion.

35 Claims, 10 Drawing Sheets

|  | Throughput | Success Rate | Actual Transaction Success Rate |
|---|---|---|---|
| RSM | 34.1 MB/s | 96.50% | 100% |
| Conventional techniques | 13.4 MB/s | 93.97% | 94.24% |
| Difference | 254.52% | 102.69% | 106.11% |

FIG. 8A

|  | Throughput | Success Rate |
|---|---|---|
| RSM | 18.8 MB/s | 96.78% |
| Conventional techniques | 14.4 MB/s | 77.32% |
| Difference | 130.60% | 125.17% |

FIG. 8B

NETWORK SERVICES RESOURCE MANAGEMENT

TECHNICAL FIELD

The disclosure relates to computer networks and, more specifically, managing resources on a network device that applies services to packet flows.

BACKGROUND

A typical computer network, such as an internet protocol (IP)-based network, supports communications between various network devices. The devices may, for example, include personal computers, laptops, workstations, personal-digital assistants (PDAs), mobile telephones, wireless devices, network-ready appliances, file servers, print servers, routers, or other devices. For two devices to communicate, applications executing on the devices create an application-layer session and establish a connection between the devices for the session using a communication protocol, such as the transmission control protocol (TCP). The applications may then exchange application-layer (that is, OSI Layer Seven) data over the connection using packets. Devices, referred to as routers, forward packets associated with the connection through the physical network that connects the devices.

Various kinds of processing of the application-layer data exchanged within an application-layer communication session can be done by intermediate devices placed along the path taken by packets that carry the application-layer data. Some examples of the kinds of processing currently performed on packet flows between devices include data compression, encryption and decryption, application-layer acceleration, anti-virus processing, and intrusion detection and prevention.

Network devices that apply services to application-layer data may experience memory bottlenecks during heavy loading conditions due to limited system memory and large packet buffering requirements for certain services.

SUMMARY

In general, the invention is directed to techniques for scheduling resource access within an intermediate network device for use in application-layer communication session processing to increase processing throughput and reduce session drops. For example, techniques are described in which an intermediate network device is configured with a set of resource thresholds that determine a particular combination of direct and indirect mechanisms by which the network device schedules resources among the sessions when a particular threshold is met. The network device then schedules resources among communication sessions according to a multi-factored allocation process that incorporates various real-time and designated properties of in-process sessions to allow the network device to simultaneously process multiple sessions despite resource congestion.

In one example implementation, a resource scheduler module (RSM) executing on a network device prioritizes each communication session into one of a set of ranked priority lists. In this example, moreover, the RSM tracks the receipt of application-layer data to monitor the progress of the various sessions, tracks inter-session dependencies, and maintains a pool of reserve memory in system memory. As the RSM allocates system memory to communication sessions for packet storage, the amount of memory used to buffer data for in-process sessions increases the system memory utilization over one of a set of resource thresholds that determine a scheduling behavior of the RSM with respect to the sessions.

As the network device receives and buffers application-layer data for application processing, system memory utilization may increase to surpass one or more of the set of resource thresholds. In response, the RSM initiates progressively more severe combinations of resource scheduling mechanisms to limit resource access to certain sessions and/or expand access to selected other sessions. The mechanisms may include closing a TCP window for a TCP connection of a session according to a corresponding session priority; selecting communication sessions according to priority and session progress and opening TCP windows for the selected sessions, permitting multiple selected communication sessions to draw upon reserve memory and thereby execute in parallel; and preempting lower priority sessions with higher priority sessions.

In one embodiment, the invention is directed to a method comprising the steps of determining a weight for each of a plurality of sessions upon receiving, with a network device, inbound packets that include application-layer data for the sessions, wherein the weight for each of the sessions is correlative to an expected receipt time for remaining application-layer data to be received by the network device for a current transaction for the respective session. The method also includes the steps of applying a service to the plurality of sessions, calculating an average weight for the plurality of sessions, selecting a first session from the plurality of sessions when the weight of the first session is less than or equal to an average weight for the plurality of sessions, and allocating additional memory resources of the network device to store additional application-layer data received in additional inbound packets for the selected first session. The method also comprises the step of preventing allocation of additional memory resources to unselected sessions in the plurality of sessions until the first session terminates.

In another embodiment, the invention is directed to an intermediate network device comprising a transmission control protocol (TCP) proxy and a weight calculator to determine a weight for each of a plurality of sessions upon receiving, with the TCP proxy, inbound packets that include application-layer data for the sessions, wherein the weight for each of the sessions is correlative to an expected receipt time for remaining application-layer data to be received by the network device for a current transaction for the respective session, wherein the weight calculator calculates an average weight for the plurality of sessions. The intermediate network device also includes an application processor to apply a service to the plurality of sessions, a selection module to select a first session from the plurality of sessions when the weight of the first session is less than or equal to an average weight for the plurality of sessions, and a buffer manager to allocate additional memory resources of the network device to store additional application-layer data received in additional inbound packets for the selected first session, wherein the buffer manager prevents allocation of additional memory resources to unselected sessions in the plurality of sessions until the first session terminates.

In another embodiment, the invention is directed to a computer-readable medium containing instructions. The instructions cause a programmable processor to determine a weight for each of a plurality of sessions upon receiving, with a network device, inbound packets that include application-layer data for the sessions, wherein the weight for each of the sessions is correlative to an expected receipt time for remaining application-layer data to be received by the network device for a current transaction for the respective session. The instructions also cause the programmable processor to apply a service to the plurality of sessions, calculate an average weight for the plurality of sessions, and select a first session from the plurality of sessions when the weight of the first session is less than or equal to an average weight for the plurality of sessions. The instructions also cause the programmable processor to allocate additional memory resources of the network device to store additional application-layer data received in additional inbound packets for the selected first session and prevent allocation of additional memory resources to unselected sessions in the plurality of sessions until the first session terminates.

The techniques of this disclosure may provide one or more advantages. For example, the techniques may enable an increase in application processing throughput by, for instance, parallelizing application-layer communication session access to reserve memory to allow parallel session processing despite resource congestion. By reducing starvation and accounting for inter-session dependencies, the techniques may also increase stability of communication sessions being processed. Further, prioritizing sessions may enable the network device to better align application processing performance with network requirements.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 8A-8B illustrate tables having records that detail contrasting performances of a resource scheduling module operating according to the techniques of this disclosure as compared to conventional techniques.

DETAILED DESCRIPTION

Figure 1:
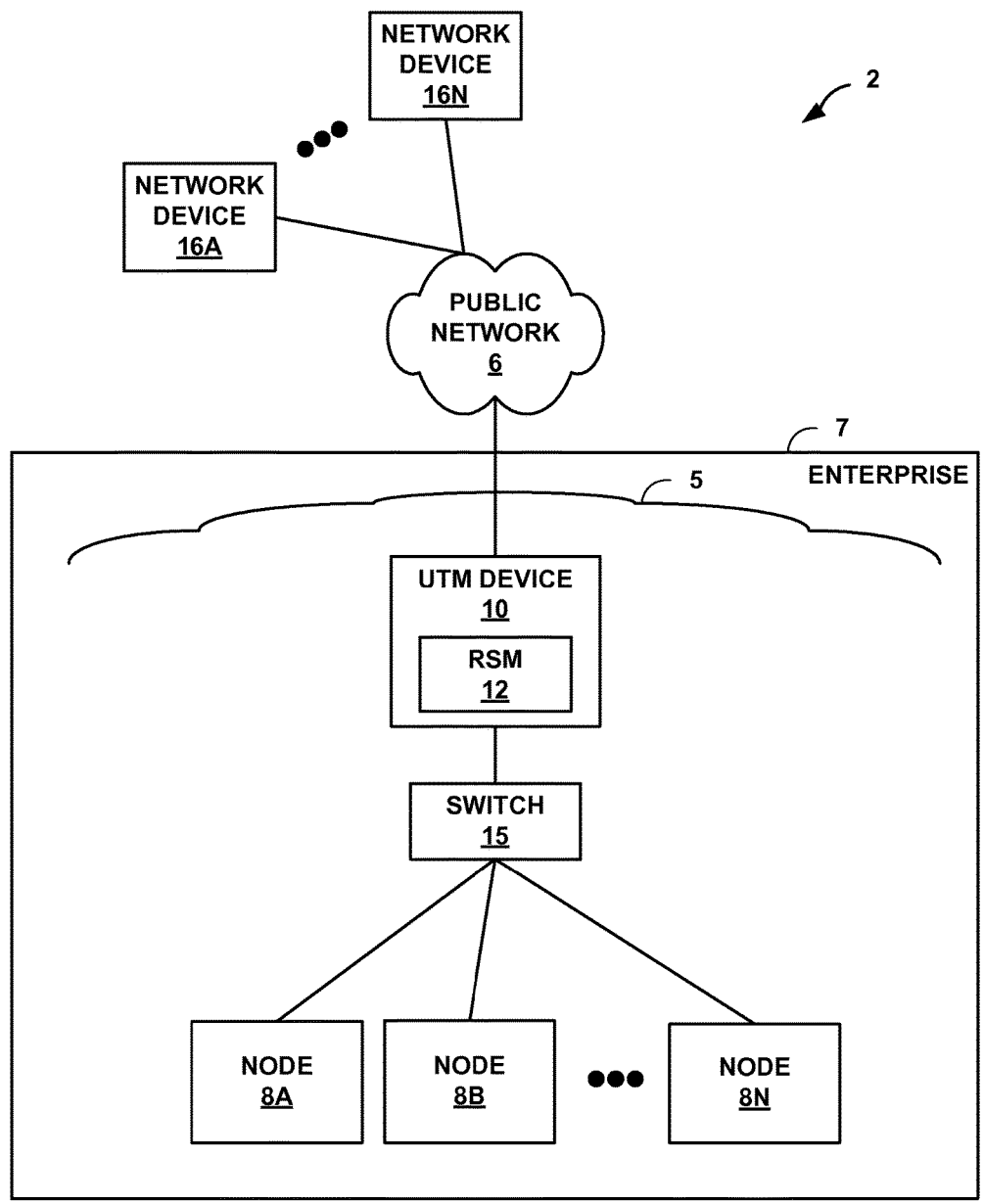
FIG. 1 is a block diagram illustrating an exemplary network system in which an exemplary network device performs the resource management techniques described in this disclosure.

FIG. 1 is a block diagram illustrating an exemplary network system 2 having components that perform the resource management techniques described in this disclosure. Network system 2 includes a public network 6 by which network devices 16A-16N (collectively, "network devices 16") communicate with internal nodes 8A-8N ("nodes 8") that operate behind enterprise boundary 5 of enterprise network 7. Nodes 8 represent any computing device within enterprise network 7, including workstations, file servers, print servers, database servers, printers and other devices. Enterprise network 7 may represent a layer two (L2) network owned and operated by a large entity, such as a university, corporation, business, or other facility or enterprise. In some embodiments, enterprise network 7 and public network 6 may each be one of a local area network ("LAN"), such as a token ring or Ethernet network, a virtual local area network ("VLAN"), or another type of network. Enterprise network 7 and public network 6 comprise one or more wired or wireless links to interconnect network devices 16 and nodes 8. Public network 6 may form part of the Internet.

Respective network devices 16 and nodes 8 exchange network packets as part of application-layer communication sessions established between the devices. In this respect, enterprise network 7 and public network 6 support the transmission of data via discrete data units, often referred to as "packets." As a result, enterprise network 7 and public network 6 may be referred to as a "packet-based" or "packet switched" networks. While described in this disclosure as transmitting, conveying, or otherwise supporting packets, enterprise network 7 and public network 6 may transmit data according to any other discrete data unit defined by any other protocol, such as a cell defined by the Asynchronous Transfer Mode (ATM) protocol.

Establishing a communication session between network devices 16 and nodes 8 may involve creating a transport-layer (that is, layer four according to the OSI model) connection using one or more packet-based protocols, such as Transmission Control Protocol (TCP) operating over Internet Protocol (IP), or TCP/IP. The communication session then uses the transport-layer connection to transport data packets. The communication session may alternatively employ a connection-less protocol, such as User Datagram Protocol (UDP) operating over IP. In such instances, the communication session itself maintains any necessary state for exchanging packetized application-layer data.

Each communication session typically includes two packet streams flowing in opposite directions between the connected devices. The term "packet flow" refers to a set of packets originating from a particular source device and sent to a particular destination device as part of an application-layer communication session between one of network devices 16 and one of nodes 8. A flow of packets, in either direction, may be identified by the five-tuple: <source IP address, destination IP address, source port, destination port, protocol>. This five-tuple generally identifies a packet flow to which a received packet corresponds.

Enterprise boundary 5 represents a security boundary between trusted elements of enterprise network 7 and external elements that harbor viruses, malicious and undesirable content, intruders, spam, and other computer-implemented villainy. Enterprise boundary 5, in this instance, is implemented by unified threat management ("UTM") device 10. UTM device 10 performs one or more network services that monitor traffic flowing between internal nodes 8 and network devices 16 to identify and prevent threats from breaching enterprise boundary 5 while enabling internal nodes 8 to access external content. Such network services may include anti-virus, intrusion detection and prevention, firewall, virtual private networking (VPN), anti-spam, content filtering, among others.

In one example, UTM device 10 may act as a proxy between one of nodes 8 and one of external network devices 16A-16N ("external network devices 16") located outside of enterprise 4. In one embodiment, UTM device 10 may be transparent to nodes 8 and external network devices 16 by maintaining a flow table that includes entries to identify, typically by way of the five-tuple, an active or current packet flow. The flow table enables UTM device 10 to characterize received packets as belonging to an active or current packet flow, or to a new packet flow. In other embodiments, UTM device 10 may operate as a full or partial proxy between nodes 8 and external network devices 16 so as to maintain separate communication sessions with the devices.

UTM device 10 processes a plurality of communication sessions between nodes 8 and external network devices 16. In some instances, application processing requires buffering flow data to search for byte-level payload patterns, or "signatures." For example, UTM device 10 may determine an application protocol for a packet flow by examining payloads to detect application-specific patterns, such as components of an HTTP request, or a secure file transfer protocol (SFTP) or Internet Relay Chat (IRC) login sequence. As another example, UTM device 10 may store and assemble a series of application-layer payloads received in packet flows in an attempt to match the application data therein to network attacks, viruses, and other malicious software carried by the flows. UTM device 10 typically processes many hundreds or thousands of applications concurrently, which generates competition for resources (e.g., main memory) that, if not properly managed, can lead to resource deadlock, process starvation, and aborted communication sessions.

For example, external network device 16A may be a server and node 8A may be a client device that requests a web page from the server using a HyperText Transfer Protocol (HTTP) GET request transmitted in a packet carried in a packet flow proceeding from node 8A to network device 16A in a TCP connection established between the two devices. As another example, node 8B may be a server and external network device 16N may be a client device that uploads information to the server using a different TCP connection.

A communication session may involve a single application-layer transaction or multiple application-layer transactions within the communication session. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection for a communication session. UTM device 10 identifies each request/response within the TCP connection as a different transaction. This may be useful to apply threat management or other services based on transaction boundaries. UTM device 10 may differentiate between transactions within the application-layer data of the packet flow by detection of delimiters (e.g., for ASCII-based transactions), or based on defined lengths (e.g., for binary-based or length-encoded transactions).

Many ASCII-based application-layer protocols utilize delimiters, for example, new line/line feed characters such as '\n' and '0x0A' and carriage return characters such as 'V' and '0x0D', to signal the transition between two transactions. Some length-encoded protocols define a particular bit pattern as a delimiter. Some length-encoded application-layer protocols define a length value (e.g., number of bytes) for a transaction. In examples using a length value for transactions, UTM device 10 identifies the end of a current transaction/start of a new transaction based on TCP sequence numbers for the TCP connection of the communication session. For instance, unlike HTTP/1.0, which requires a separate TCP connection for each transaction, HTTP/1.1 enables an HTTP client to receive multiple documents using a single TCP connection to the HTTP server. An HTTP/1.1 server response provides a length value for a requested document in the content-length field specifying a size of the document in bytes. Advance knowledge of a document size, or transaction size, allows UTM device 10 to determine a number of remaining bytes and to calculate the transmit progress of an HTTP-based transaction as the device receives application-layer data for the transaction.

As another example, a file transfer protocol (FTP) application typically involves both a control session that functions as an out-of-band signaling session used by an FTP client to send commands to an FTP server as well as a data session that FTP client and FTP server establish as needed to transfer data in response to commands exchanged with the control session. The control and data sessions each include a separate TCP connection for transferring corresponding application-layer session data. In general, UTM device 10 is not able to determine in advance a file size to be transferred in an FTP-based transaction to transfer the file from the FTP server to the FTP client. UTM device 10 thus uses a configurable "max_content_size" value as a file size to calculate a transmit progress during FTP-based transactions. As with HTTP/1.1, FTP clients may use a single TCP connection to receive multiple transactions.

Resource scheduler module 12 ("RSM 12") implements the techniques of this disclosure to allocate and manage resources for application processing by UTM device 10 to improve processing throughput and reduce deadlock to increase the incidence of successful application processing. Upon experiencing progressively higher resource utilization (i.e., congestion) due to increased application processing demands, RSM 12 employs progressively more severe combinations of direct and indirect mechanisms to schedule access to resources among the sessions.

UTM device 10 manages communication sessions for application processing and requests packet buffering resources from RSM 12 for packet data received in the sessions. As RSM 12 allocates system memory as packet buffering resources, the amount of memory used to buffer in-process communication flows increases the system memory utilization. As processing for a session completes, UTM device 10 signals RSM 12 to free any packet buffering resources for the session.

In accordance with the techniques of this disclosure, RSM 12 prioritizes application-layer communication sessions according to an application priority configuration of UTM device 10. That is, sessions carrying particular applications receive a priority designated for those applications by UTM device 10. RSM 12 monitors, in real-time, each session's weight as packets are received for the session. In some instances, a relatively low session weight may represent a relatively high probability of impending receipt of all remaining (or "outstanding") transaction data for the current transaction for the session. In addition, RSM 12 tracks inter-session dependencies that may affect processing completion for the sessions. RSM 12 then schedules resources and takes other actions vis-à-vis the sessions according to a multi-factored comparison of the in-process sessions that incorporates the designated priorities, the real-time weights, inter-session dependencies, and the current system resource utilization.

Specifically, as system resource utilization (e.g., memory utilization) increases so as to exceed one of a set of designated resource thresholds, RSM 12 performs one or more of the following packet-driven mechanisms, first with respect to low priority sessions, then gradually encompassing the high priority sessions as well: (1) closing TCP windows of session connections, (2) comparing session weights and selecting a set of low-weight sessions to maintain open TCP windows, (3) allocating reserved memory for the selected sessions to enable parallel application of services to multiple selected sessions, (4) aborting sessions in a priority list that fail to finish within a designated time interval, (5) aborting selected sessions that do not finish within a designated time interval, (6) closing TCP connection windows of dependent sessions, and (7) aborting any sessions for which the current transaction for the session fails to finish within a prescribed time limit. In addition, RSM 12 may preempt low priority sessions in-process by aborting the sessions, allowing reserve memory to be freed, and then selecting high priority sessions in place of low priority sessions when sufficient reserve memory becomes available.

By performing the techniques in this manner, RSM 12 may increase the number of sessions that may be processed in parallel during periods of congestion, thus improving processing throughput. In addition, by reducing starvation and accounting for inter-session dependencies, RSM 12 may also increase communication session stability. Further, prioritizing sessions may enable UTM device 10 to better align application processing performance with network requirements and user expectations in order to enhance the node 8 users' experience.

Figure 2:
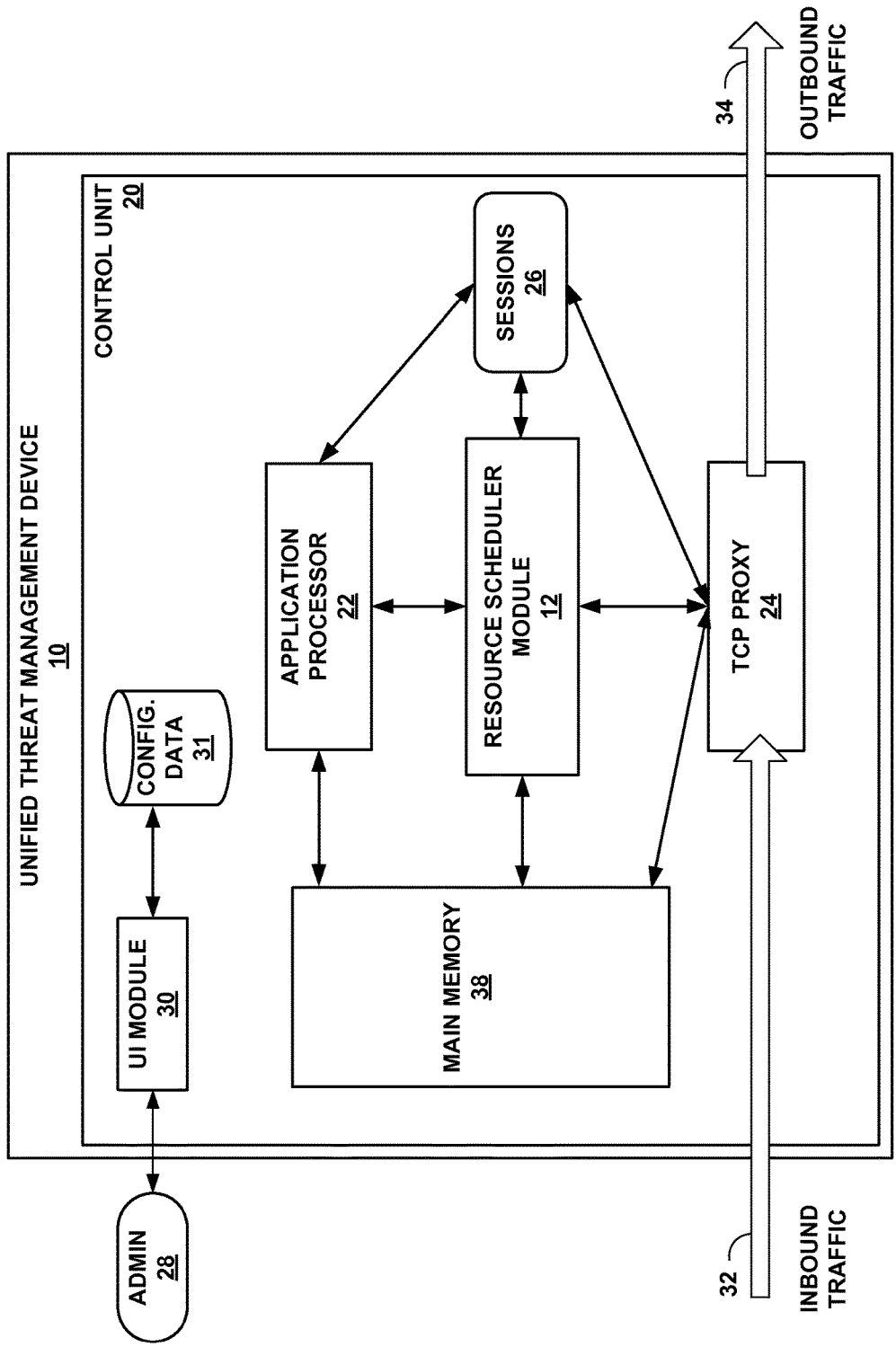
FIG. 2 is a block diagram illustrating an exemplary unified threat management device that operates according to the techniques of this disclosure.

FIG. 2 is a block diagram illustrating exemplary unified threat management device 10 ("UTM device 10") of FIG. 1 in further detail. UTM device 10 monitors inbound network traffic 32, applies threat management services to the traffic, and forwards the network traffic as outbound network traffic 34. Although the example illustrated in FIG. 2 is described in terms of a dedicated unified threat management device 10, the techniques may be applied to any intermediate device that performs operations on communications sessions, such as data compression, encryption and decryption, TCP acceleration, application-layer acceleration, and intrusion detection and prevention. The techniques may also be applied to a firewall that performs anti-virus operations. Moreover, the functionality described herein may be incorporated within other devices, such as a switch, or within a proxy server, load balancer, router, gateway, intelligent switch, intelligent hub, or other type of intermediate network device.

As illustrated in FIG. 1, UTM device 10 includes control unit 20. Control unit 20 may comprise one or more processors (not shown in FIG. 2) that execute software instructions, such as those used to define a software or computer program, stored to a computer-readable storage medium, such as a storage device (e.g., a disk drive, or an optical drive), memory (such as Flash memory, random access memory or RAM) or any other type of volatile or non-volatile memory (not shown in FIG. 2), that stores instructions to cause a programmable processor or controller to perform the techniques described herein. Alternatively, or in addition to programmable elements, control unit 20 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 20 may comprise an operating system that provides an operating environment for user-level processes. One example of an operating system is the JUNOS™ operating system provided by Juniper Networks, Inc. of Sunnyvale, Calif. Another example of an operating system is the ScreenOS operating system, also provided by Juniper Networks, Inc. of Sunnyvale, Calif.

Application processor 22 of control unit 20 applies services to communication sessions 26 ("sessions 26") having transport-layer connections established by TCP proxy 24 to intermediate communication between client-server pairs. In some examples, TCP proxy 24 may intercept transport-layer (e.g., TCP or UDP) flow identifiers for communication sessions having application-layer data that traverses UTM device 10. In such examples, TCP proxy 24 stores the flow identifiers in a flow table used by the TCP proxy to assign packets in inbound traffic 32 to a particular TCP flow and hence to a particular one of sessions 26. In the illustrated example, UTM device 10 sends and receives packet flow data in inbound traffic 32 via a network interface (not shown) using TCP proxy 24 and outputs outbound traffic 34 also via a network interface (also not shown). TCP proxy 24 may participate in a three-way TCP handshake that initiates a new TCP connection. When a new application-layer session has been initiated, TCP proxy 24 notifies application processor 22 of the new session, and stores information about the new session, such as the source and destination addresses, memory requirements, transport-layer information, and application-layer information, as a session entry in sessions 26.

Each session entry in sessions 26 stores information needed to calculate a weight of the corresponding session. A session weight is a value that represents a relative expected completion time for the session with respect to the other sessions in sessions 26. A session weight is calculated using the corresponding session transmit speed, required buffer space for the session, and the amount of application-layer session data already received by TCP proxy 24. Although described as being performed by TCP proxy 24, one or more of these functions may be performed by an application proxy or other module.

If a session involves multiple transactions, application processor 22 differentiates between transactions within the application-layer data of the packet flow carried in the TCP connection for the session. Upon identifying a new transaction, application processor 22 reinitiates the session entry in sessions 26.

Main memory 38 of control 20 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by a computer. Main memory 38 provides a physical address space composed of addressable memory locations.

Resource scheduler module 12 ("RSM 12") performs the techniques of this disclosure to allocate, and thereafter manage, portions of main memory 38 among different ones of sessions 26 competing for resources required by application processor 22 to apply services to the sessions. Specifically, RSM 12 receives requests from TCP proxy 24 for memory buffer space to store packets received in communication sessions 26, allocates such buffer space from main memory 38 according to the techniques of this disclosure, and returns a reference (e.g., a pointer) to the buffer to TCP proxy 24. TCP proxy 24 copies incoming packets associated with sessions 26 to the respective packet buffer allocated by RSM 12 from main memory 38 for the session. RSM 12 monitors main memory 38 utilization and signals TCP proxy 24 to manage TCP windows for sessions 26 to manage the rate at which application-layer data for sessions 26 is received. In one example, TCP proxy 24 uses the TCP flow control protocol to close the window of a TCP connection for a session to throttle TCP flows for the session.

Application processor 22 reassembles an application-layer communication from the data in one or more packets stored in one or more packet buffers for a session and scans the application-layer communication (e.g., a file, message, header, or web page) for threats. In the event no threats are found, TCP proxy 24 outputs one or more packets that carry the application-layer data to the destination of the communication as outbound traffic 34. After applying services to application-layer data for a session, application processor 22 directs RSM 12 to free the packet buffers for the session. RSM 12 thus operates, in this respect, as middleware between TCP proxy 24 and application processor 22.

UI module 30 of control unit 20 presents a user interface, such as a graphical user interface (GUI), command-line interface (CLI), or a programmatic interface, to administrator 28 to enable the administrator to set configuration data 31 for UTM device 10. Configuration data 31 stores, e.g., threat signatures and settings that determine an operation of application processor 22. Per the techniques of this disclosure, configuration data 31 additionally stores settings that determine operation of RSM 12. For example, administrator 28 sets session priority rules in configuration data 31 to establish respective priorities for different application-layer communication sessions in sessions 26. For example, the session priority rules may set one priority level for real-time applications, such as Voice-over-IP (VoIP) calls, carried by various ones of sessions 26 and another priority level for bulk file transfer applications, such as FTP, carried by other ones of sessions 26.

Figure 3:
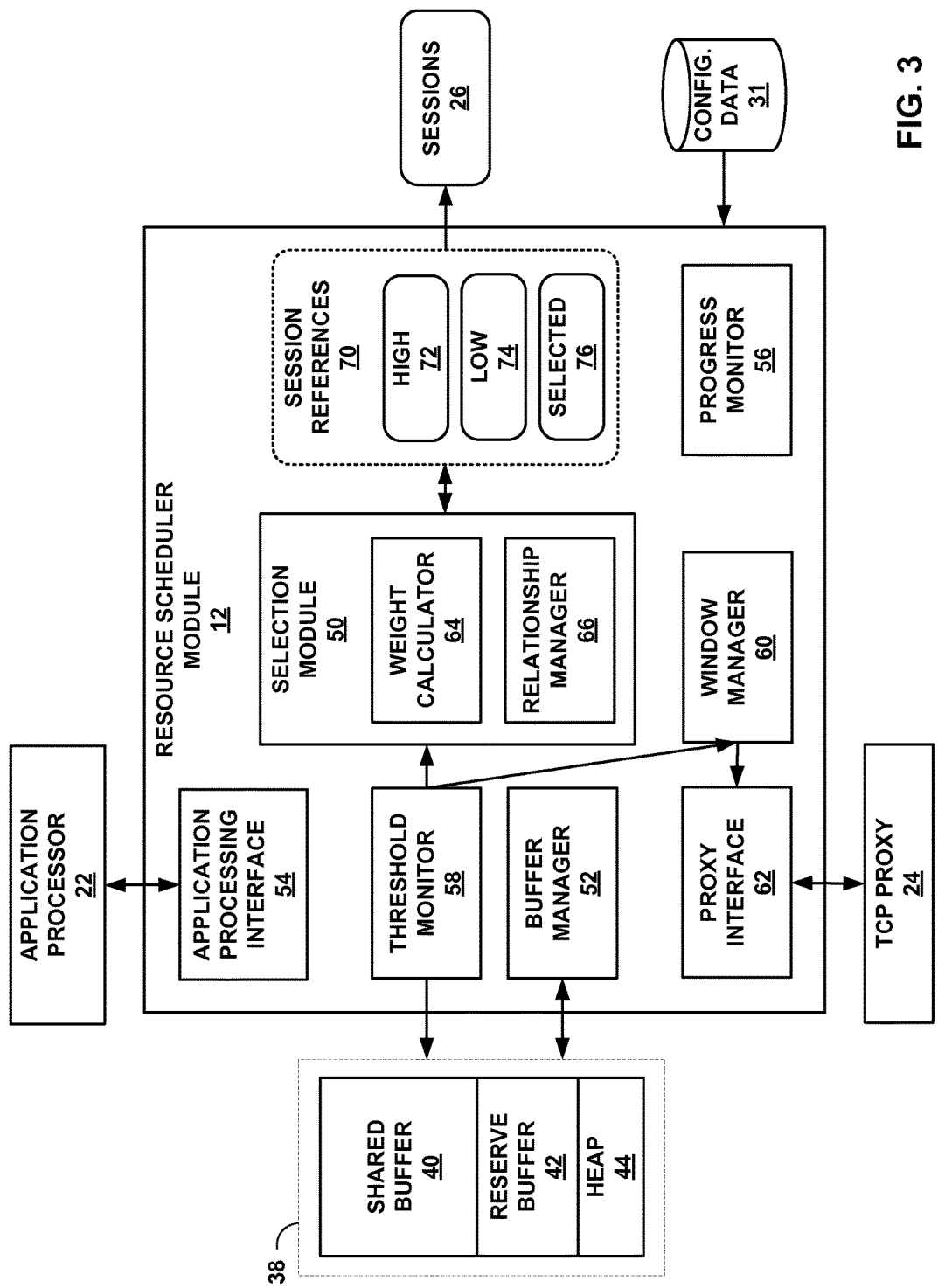
FIG. 3 is a block diagram illustrating an exemplary resource scheduling module, which manages resources in accordance with the techniques of this disclosure.

FIG. 3 is a block diagram illustrating RSM 12, which manages UTM device 10 resources in accordance with the techniques of this disclosure, in further detail along with other components of UTM device 10. RSM 12 modules allocate and manage portions of main memory 38 for processing of application-layer session data received by TCP proxy 24 and processed by application processor 22. RSM 12 includes application processing interface 54 and proxy interface 62, which present respective interfaces by which application processor 22 and TCP proxy 24 exchange messages and session data with RSM 12.

Proxy interface 62 receives, from TCP proxy 24, references (e.g., a pointer) to new sessions established by TCP proxy 24 and represented in sessions 26. For each reference received, proxy interface 62 assigns a priority level indicating a relative significance of the corresponding session. Proxy interface 62 may assign priority to sessions according to application protocol, transport protocol, source/destination addresses, port number, or another communication session characteristic. As described in detail below, proxy interface 62 may also assign priority to sessions according to inter-session relationships maintained by relationship manager 66. To determine a priority for a session, proxy interface 62 may query configuration data 31 or query application processor 22 via application processing interface 54. Upon assigning a priority to a session reference, proxy interface 62 copies the reference data (e.g., a pointer) to a priority list in session references 70.

Session references 70 of RSM 12 include a plurality of data structures that store references to individual entries of sessions 26. In the illustrated example, session reference 70 includes high priority list 72, low priority list 74, and selected sessions list 76. Each of the respective lists in session references 70 may comprise, for example, a linked list, an array or table, an ordered tree, or other data structure to store references (e.g., pointers) to sessions 26 as well as other data associated with sessions 26, such as session weight. Each of high priority list 72 and low priority list 74 additionally comprises fields with which to store values for the total remaining number of bytes (hereinafter "total remaining value") expected for the respective current transaction for each session referenced in the respective priority list, as well as the sum of all session weights for the sessions (hereinafter, "sum of session weights value") referenced in the respective priority list. Proxy interface 62 updates the total remaining value and sum of session weights value fields as TCP proxy 24 receives data packets for current transactions of any of sessions 26. As described in detail below, selection module 50 arranges sessions referenced in high priority list 72 and low priority list 74 by the session weight associated with each of the sessions. In some embodiments, session references 70 comprises sessions 26 and each of the respective lists stores a subset of sessions 26 entries or copies of such entries. In some embodiments, session references 70 may include additional priority lists of finer priority granularity.

Main memory 38 includes heap 44, a pool of available packet buffer memory. Shared buffer 40 and reserve buffer 42 represent logical data structures maintained on top of heap 42 that are used for allocating packet buffers to temporarily store incoming application-layer data using memory from heap 44. In one example, shared buffer 40 and reserve buffer 42 comprise a plurality of fixed-size memory chunks each represented in a linked list. Buffer manager 52 allocates buffer space from shared buffer 40, responsive to TCP proxy 24 requests, to sessions 26 for application-layer data received by TCP proxy 24 and corresponding to the respective sessions. Other processes (not shown) executing on the operating environment provided by control unit 20 share shared buffer 40 with application processor 22, RSM 12, and TCP proxy 24. This circumstance may contribute to resource congestion experienced by UTM device 10.

Buffer manager 52 reserves an amount of memory as reserve buffer 42 sufficient to process the current transaction for at least one of sessions 26 to completion despite exhaustion of shared buffer 40. In the absence of excessive congestion, buffer manager 52 allocates packet buffers for all sessions 26 from shared buffer 40. In one example, buffer manager 52 reserves 30 MB of main memory 38 as reserve buffer 42. The size of reserve buffer 42 may be determined according to customer specifications and be set in configuration data 31 by an administrator. As application processor 22 completes application of services to any of sessions 26, application processor 22 directs buffer manager 52 to free buffer space allocated to the completed session.

RSM 12 additionally comprises selection module 50 to, upon congestion, select individual sessions referenced by high priority list 72 and/or low priority list 74. Selection module 50 transfers references to sessions selected from high priority list 72 and low priority list 74 to selected sessions list 76. Selection module 50 comprises weight calculator 64 to calculate, for a session in sessions 26, a new weight for the session upon receiving a session data packet. A session weight correlates to an expected time to receive all remaining data for the current transaction of a session. In general, a higher session weight indicates a later expected receipt time for the remaining data for the current transaction for the session.

In this example, weight calculator 64 calculates a session weight according to the formula:

$$W=(\text{required}-\text{received})/\text{speed},$$

where W is a session weight, required represents the maximum number of bytes for the current transaction for the session that application processor 22 is to process, received represents the number of bytes that TCP proxy 24 has received for the current transaction for the session, and speed represents the rate at which TCP proxy 24 receives application-layer data for the session. Entries in session references 70 store values for factors of the above formula when these factors are known to UTM device 10. In some embodiments, application processor 22 determines a value for the required factor for a session. For example, application processor 22 may use a configurable "max_content_size" value as a value for required in an FTP-based transaction. In another example, application processor determines a required value from the content-length field within an HTTP GET response from a server responding to an HTTP GET request. In some instances, application processor 22 directs buffer manager 52, via application processing interface 54, to reserve buffer space in shared buffer 40 or reserve buffer 42 for the entirety of the required amount of data. The value of required−received for a session indicates a remaining amount of data to be received by UTM device 10 for the current transaction for the session.

TCP proxy 24 directs proxy interface 62 to update the received factor as application-layer data is buffered. Weight calculator 64 may determine a value for the speed factor. As one example, weight calculator 64 may start a timer for a session after, for example, TCP proxy 24 receives a SYN packet for the session, completes a three-way TCP handshake for the session, or receives a first data packet for a session. After TCP proxy 24 receives a specified number of packets or a specified number of bytes for a session or (as another example) waits for a specified time interval, weight calculator 64 may determine speed according to the ratio of data received/timer value.

Weight calculator 64 is "packet-driven," i.e., whenever TCP proxy 24 receives a packet corresponding to a session, TCP proxy 24 sends a message to proxy interface 62 to trigger weight calculator 64 to update a weight value and, in some cases, a speed value in session references 70 for the corresponding session. Updates to the total remaining value and sum of session weights value fields high priority list 72 and low priority list 74 are also packet-driven, in that proxy interface 62 updates the fields in the appropriate priority list upon receiving a message from TCP proxy 24 indicating a newly received packet for a session. Because session selection depends upon the respective weights of the sessions, selection is a packet-driven scheduling mechanism.

Selection module 50 also includes relationship manager 66 to identify and manage inter-session dependencies ("relationships") among sessions 26. Some applications, such as FTP, generate more than one session to perform a particular task, e.g., a control session and a data session. In such instances, the sessions have a parent-child relationship that, if not accounted for by RSM 12 during resource scheduling, could result in multiple session failure. For example, if RSM 12 closes a TCP window for a TCP connection that carries control/signaling messages for an FTP session, control messages may not be received by the endpoint in a timely manner, leading to failure of the FTP session. Similarly, if RSM 12 closes a TCP window for a child data channel for an FTP session, the FTP session may fail due to non-receipt of data and inability of the corresponding control session to finish.

Relationship manager 66 may identify inter-session relationships among sessions 26 by analyzing individual session entries for similar flow characteristics. In some examples, application processor 22 may provide relationship manager 66, via application processing interface 54, with a data structure detailing inter-session relationships among a subset of sessions 26 for a particular application. In some examples, TCP proxy 24 identifies inter-session relationships as such sessions are established and informs relationship manager 66 of the relationships via proxy interface 62.

Relationship manager 66 stores relationship data to session references 70 by associating the data with references stored by high priority list 72, low priority list 74, and selected sessions list 76. For example, a reference to a first session in sessions 66 in high priority list 72 may be associated with a parent reference (e.g., a pointer to another session) and/or a list of child references (e.g., a linked list of pointers to other sessions). In some embodiments, relationship manager 66 maintains a data structure separate from session references 70, such as table of families with an entry for each combination of sessions 26 that has members of an inter-session relationship.

When proxy interface 62 receives a message from TCP proxy 24 that indicates a new session, relationship manager 66 determines whether the new session is a child of another session. If so, proxy interface 62 assigns the new child session to the same priority list that references the parent session. For example, if a parent session is referenced in high priority list 72, proxy interface 62 assigns the new child session for the parent session to high priority list 72. In this way, related sessions will have identical priorities and be scheduled similarly by RSM 12.

As described in further detail below, selection module 50 comprising weight calculator 64 and relationship manager 66 selects different ones of sessions 26 for placement to selected sessions list 76 according to current resource utilization, the respective priorities of the sessions, the respective weights of the sessions, and the inter-session relationships of the sessions. In addition, selection module 50 during session selection accounts for the average weight of all sessions in a particular priority list under consideration, as well as available space in reserve buffer 42 and/or an average amount of buffer space required by all sessions in the particular priority list.

Window manager 60 of RSM 12 directs TCP proxy 24 via proxy interface 62 to control the respective TCP sliding windows for sessions 26. Window manager 60 "opens" (i.e., allows additional receipt of session data) or "closes" (i.e., proscribes additional receipt of session data) TCP sliding windows of sessions 26 according to current resource congestion experienced by UTM device 10 and to assignments, by RSM 12 modules, of respective sessions to different lists within session references 70. By closing a TCP sliding window for a session connection, window manager 60 causes TCP proxy 24 to advertise a window size of zero for the session, which indicates to a sender that TCP proxy 24 is unable/unwilling to receive additional data for the session. In this way, window manager 60 throttles the TCP flow and may temporarily reduce the amount of resources required by UTM device 10 to service the session. As a result, RSM 12 prevents additional resources from being allocated to the session until congestion is reduced or other, selected sessions are terminated. Window manager 60 opens a TCP sliding window for a session by causing TCP proxy 24 to advertise a non-zero window size to a sender for the session to enable receipt of additional session flow data by TCP proxy 24.

Threshold monitor 58 tracks resource utilization within UTM device 10. In the illustrated embodiment, threshold monitor 58 monitors main memory 38 utilization and, in accordance with the techniques of this disclosure, initiates progressively more severe combinations of direct and indirect mechanisms provided by the illustrated constituent components of RSM 12 to schedule access to packet buffer space in main memory 38 among sessions 26 during periods of memory congestion.

In the exemplary embodiment of RSM 12, threshold monitor 58 triggers different scheduling mechanisms of RSM 12 components when main memory 38 utilization exceeds one of pre-defined memory thresholds 1-5. Memory thresholds 1-5 increase from one to the next. That is, memory threshold 3 signifies a higher memory utilization than memory threshold 2, which signifies a higher memory utilization than memory threshold 1. Memory thresholds 1-5 thus function as watermarks that trigger various operations of RSM 12 when reached. Each of memory thresholds 1-5 may be expressed, for example, as a utilization percentage or as an absolute value. For instance, memory threshold 1 may have a value of "70%" or a value of "600 MB." Memory thresholds 1-5 may be customizable to account for customer-dependent requirements and tolerances. In some embodiments, an administrator may configure memory thresholds 1-5 in configuration data 31 for lookup and use by threshold monitor 58.

RSM 12 further comprises progress monitor 56 to ensure that the current transaction for each of sessions 26 is advancing toward processing completion. Progress monitor 56 queries threshold monitor 58 for the current memory status (e.g., the current highest memory threshold that memory utilization is presently exceeding) and re-opens a subset of the closed TCP windows if the memory utilization has dropped below a previously exceeded threshold. In some instances, progress monitor 56 periodically queries threshold monitor 58. In some instances, threshold monitor 58 triggers progress monitor 56.

In addition, progress monitor 56 records a starting time at which a session in sessions 26 is added to a priority list, transferred to selected sessions list 76, or initiates a new transaction. If application processor 22 fails to process the session within a prescribed time limit, progress monitor 56 aborts the session.

Figure 4A:
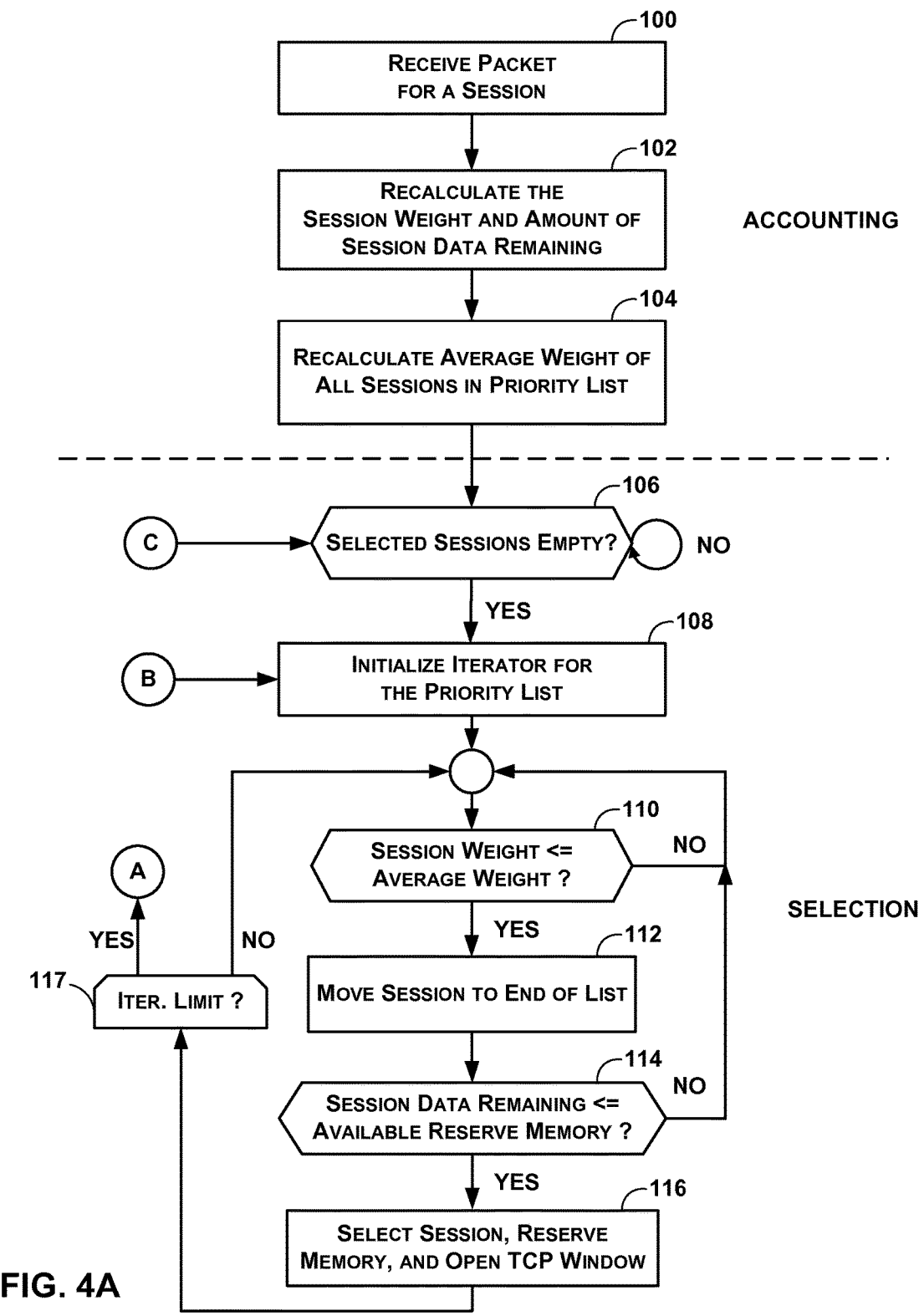
FIGS. 4A-4B depict a flowchart illustrating an example operation of the resource scheduling module of FIG. 3 for selecting a subset of application-layer communication sessions to schedule access to resources in accordance with the described techniques.
Figure 4B:
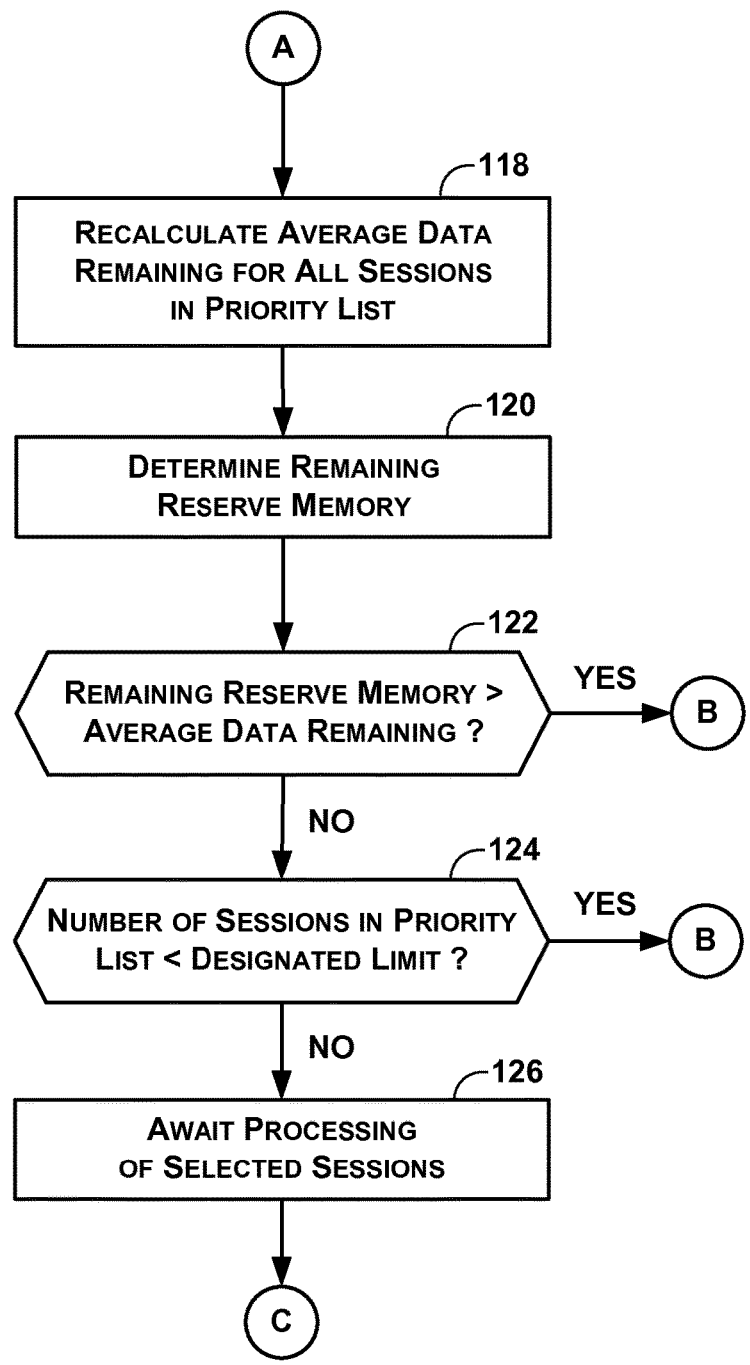

FIGS. 4A-4B show a flow chart illustrating an example operation of RSM 12 of FIG. 3 for selecting a subset of sessions 26 to schedule access to resources in accordance with the described techniques. When UTM device 10 receives a packet corresponding to an existing one of sessions 26 (100), RSM 12 accounts for the packet receipt by updating selection factors affected by the packet receipt. Specifically, weight calculator 64 recalculates the weight of and amount of application-layer data remaining for the current transaction for the corresponding session (102) and additionally recalculates the average weight of all sessions that occupy the priority list (e.g., high priority list 72 or low priority list 74) that references the corresponding session (104). To recalculate the average weight of all sessions referenced in a priority list, weight calculator 64 uses the sum of session weights value stored by the priority list. In various embodiments, the average weight may refer to either the mean weight or the median weight.

As described in further detail below with respect to FIG. 5, if a threshold monitor 58 detects a triggering threshold is reached, threshold monitor 58 may direct selection module 50 to select a subset of sessions referenced by one of the priority lists for placement in selected sessions list 76 to enable parallel application of a service by application processor 22 to the selected subset. First, selection module 50 checks to determine whether selected sessions list 76 is empty and, if not (NO branch of 106), waits until the currently selected sessions are aborted, completed, or fail. When the sessions list 76 is emptied (YES branch of 106), selection module 50 initializes an iterator for the priority list from which sessions will be selected (108). Selection module 50 then iterates through sessions referenced by the priority list to analyze and select sessions that satisfy RSM 12 selection criteria.

In the depicted exemplary mode of operation, at each iteration (i.e., for each session in the priority list), selection module 50 determines whether the weight of the session is less than or equal to the average weight of all sessions in the priority list (110). In general, a lower session weight correlates to an earlier expected receipt of the remaining data for the current transaction for a session. If the session weight exceeds the average weight of all sessions in the priority list (NO branch of 110), selection module 50 iterates to the next session in the priority list. Otherwise (YES branch of 110), selection module 50 moves the session to the end of the priority list to ensure higher than average weight sessions are grouped at one end of the list while lower than average weight sessions are grouped at another end of the list (112). This may improve the efficiency of future selection processes.

If the session has lower than average weight and the remaining data to be received for the current transaction for the session is less than or equal to the available memory space reserve buffer 42 (i.e., could be stored by or "fit" into reserve buffer 42 given current resource allocations) (YES branch of 114), selection module 50 selects the session for removal from the priority list and placement in selected sessions list 76 (116). Upon selection of the session, buffer manager 52 additionally reserves, but does not necessarily allocate, a portion of reserve buffer 42 for the remaining data for the current transaction for the session (116) and window manager 60 opens the TCP window for the session to enable receipt of additional data for the session by TCP proxy 24 (116). When a session is selected, weight calculator 64 discontinues accounting for the session. For example, weight calculator 64 no longer updates a weight for a session after selection module 50 selects the session.

In some embodiments, selection module 50 provides for selection of related sessions to prevent aborted sessions caused by differing priorities/selection weights. If a session is a parent session, then selection module 50 does not directly select the session for placement in selected sessions list. Rather, using relationship information maintained by relationship manager 66, selection module 50 co-selects parent sessions when selection module 50 selects a corresponding child session. That is, when selection module 50 selects a child session, selection module 50 also selects the parent session for that child session for placement to selected sessions list 76. In this way, selection module 50 may ensure, for example, that inter-session dependencies can be satisfied, reducing deadlock and attendant starvation, by scheduling resources to related sessions to enable continued receipt of data for the related sessions.

If selection module 50 has not reached the end of the priority list (NO branch of 117), selection module iterates and analyzes the next session in the list for possible selection. Otherwise (YES branch of 117), selection module 50 determines whether to make an additional pass-through the priority list to select additional sessions. In some instances, selection module 50 may iterate through a priority list selecting sessions, yet have remaining reserve buffer 42 memory space upon reaching the end of the list. When selection module 50 selects a session, selection module 50 removes the session from the referencing priority list and transfers the session to selected sessions list 76. Selection module 50 recalculates the average data remaining to be received for all sessions in the priority list after iterating through the list and transferring sessions as part of a selection process (118). Selection module 50 may use the total remaining value field of the priority list for recalculating average data remaining. Selection module 50 additionally queries buffer manager 52 to determine a remaining amount of memory space in reserve buffer 42 (120).

If the remaining reserve memory space exceeds the average data remaining for all sessions in the priority list (YES branch of 122) or if the number of sessions in the priority list is fewer than a designated limit (YES branch of 124), selection module 50 reinitiates and performs the selection process for the priority list to select additional sessions for processing. In some embodiments, the designated limit is 3000 sessions. If, however, selection module 50 determines that insufficient reserve memory is available and a sufficient number of sessions is selected, then TCP proxy 24 continues to receive additional data for the selected sessions via the open TCP windows, and application processor 22 continues to process the selected sessions. RSM 12 waits for selected session list 76 to empty due to completion, aborting, failure, or other type of termination of the selected sessions before performing another selection process (126).

Figure 5A:
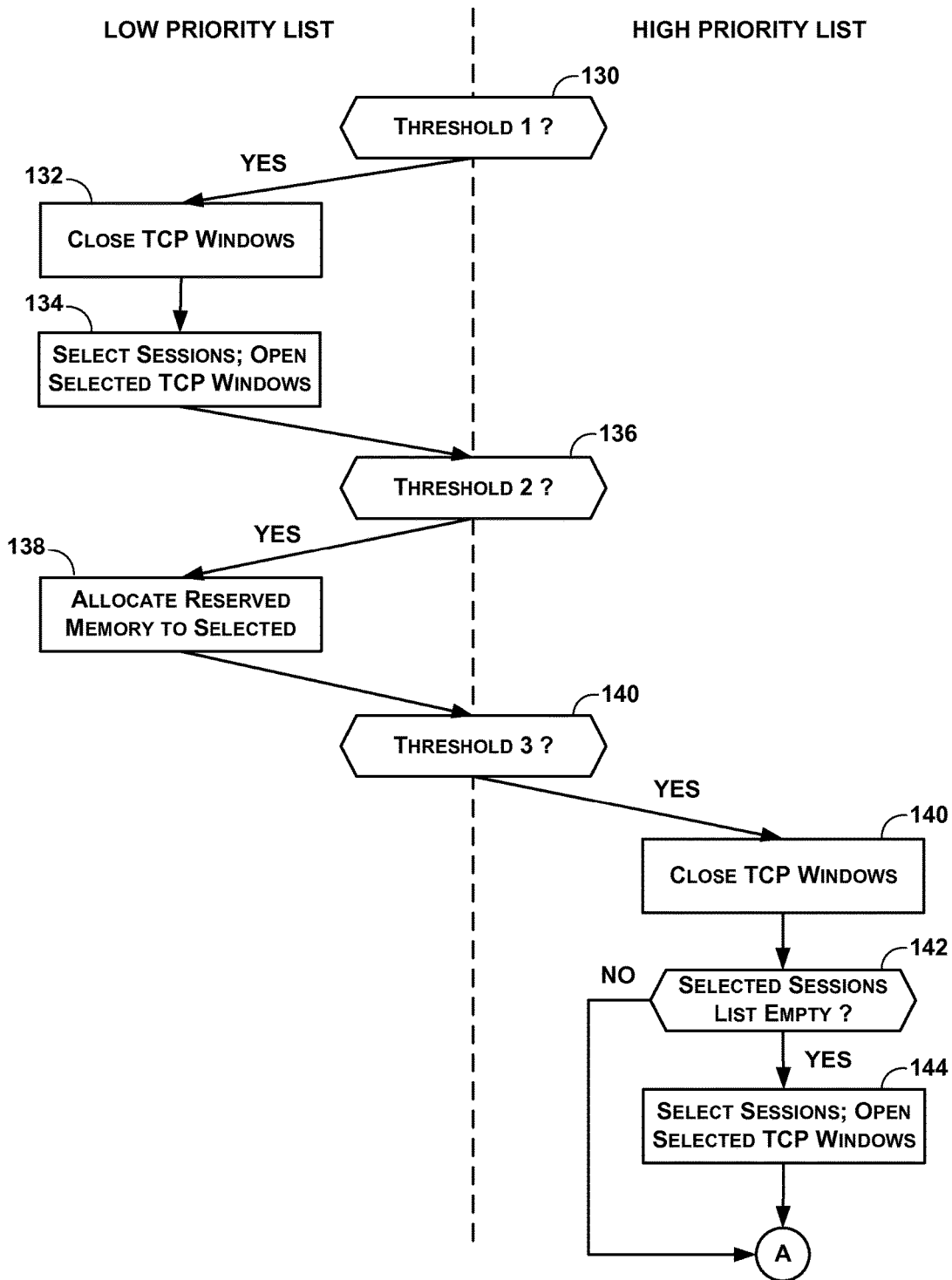
FIGS. 5A-5B depict a flowchart illustrating an example mode of operation of the exemplary resource scheduling module of FIG. 3 to prioritize selected sessions and allocate resources using progressively stronger mechanisms upon reaching various memory thresholds, according to the techniques herein described.
Figure 5B:
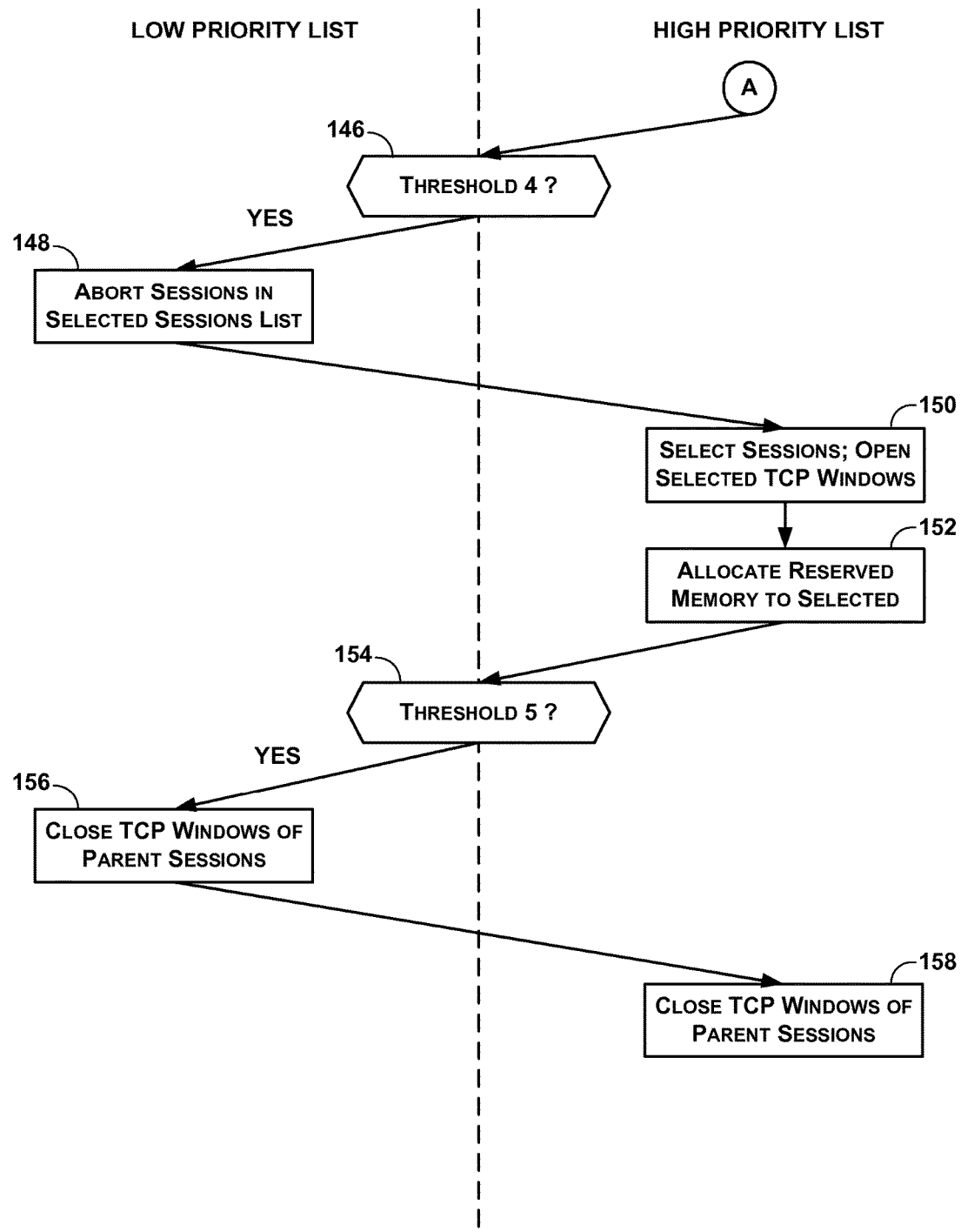

FIGS. 5A-5B show a flowchart illustrating an example mode of operation of exemplary RSM 12 of FIG. 3 to prioritize selected sessions and allocate resources using progressively stronger mechanisms upon reaching various memory thresholds, according to the techniques herein described. FIGS. 5A-5B are bifurcated to show respective operations of RSM 12 with respect to either high priority list 72 or low priority list 74. Threshold monitor 58 monitors main memory 38 to detect whether memory utilization exceeds one of memory thresholds 1-5 established by, for example, configuration data 31.

When threshold monitor 58 determines that memory utilization is exceeding memory threshold 1 (YES branch of 130), window manager 60 closes one or more TCP windows for any sessions 26 that are referenced in low priority list 74 (132). If any sessions to be closed are parent sessions, window manager 60 delays closing the sessions' TCP windows for a time to enable additional data for the parent sessions to be received. In addition, selection module 50 performs a selection process in accordance with the techniques described above to select sessions in low priority list 74 for placement in selected sessions list 76 (134). Selection module 50 directs window manager 60 to open the TCP windows of the selected sessions (134). If any selected sessions are child sessions, window manager 60 delays opening the sessions' TCP windows for an predetermined interval to allow data for corresponding parent sessions to first be received by TCP proxy 24.

When threshold monitor 58 determines that memory utilization is exceeding memory threshold 2 (YES branch of 136), buffer manager 52 allocates additional resources to sessions selected from low priority list 74 for placement in selected sessions list 76. Buffer manager 52 allocates memory space from reserve buffer 42 to the sessions referenced by selected sessions list 76 to enable continued parallel execution of the selected sessions (138).

When threshold monitor 58 determines that memory utilization is exceeding memory threshold 3 (YES branch of 140), RSM 12 begins congestion control for high priority list 72 in addition to congestion control for low priority list 74. Window manager 60 closes one or more TCP windows of sessions in high priority list 72 (140). If any sessions to be closed are parent sessions, window manager 60 delays closing the sessions' TCP windows for a time to enable additional data for the parent sessions to be received. In addition, if selected sessions list 76 does not presently reference any of sessions 26 (YES branch of 142), selection module 50 performs a selection process in accordance with the techniques described above to select sessions referenced in high priority list 74 for placement in selected sessions list 76 (144). Window manager 60 opens the TCP windows for selected sessions transferred to selected sessions list 76. If any selected sessions are child sessions, window manager 60 delays opening the sessions' TCP windows for an predetermined interval to allow data for corresponding parent sessions to first be received by TCP proxy 24. If selected sessions is not empty because, for example, application processor 22 is still processing sessions selected from low priority list 74 (NO branch of 142), selection module 50 does not select additional sessions from high priority list 72. Threshold monitor 58 continues monitoring memory utilization (146).

When threshold monitor 58 determines that memory utilization is exceeding memory threshold 4 (YES branch of 146), selection module 50 increases the severity of congestion control techniques. Specifically, after memory threshold 4 is reached, selection module 50 first aborts any low priority sessions remaining in selected sessions list 76 in favor of high priority sessions (148). Selection module 50 then performs a selection process in accordance with the techniques described above to select sessions referenced in high priority list 74 for placement in selected sessions list 76 (150). In this way, selection module 50 preempts selected low priority sessions with high priority sessions to ensure high priority sessions have access to reserve buffer 42 memory space. Window manager 60 opens the TCP windows of selected sessions (150). If any selected sessions are child sessions, window manager 60 delays opening the sessions' TCP windows for an predetermined interval to allow data for corresponding parent sessions to first be received by TCP proxy 24. Buffer manager 52 allocates additional resources to the selected sessions because selected sessions continue to receive session data commensurate with their open TCP windows. Buffer manager 52 allocates memory space from reserve buffer 42 to the sessions now referenced in selected sessions list 76 to enable continued parallel execution of the selected sessions (152).

When threshold monitor 58 determines that memory utilization is exceeding memory threshold 5 (YES branch of 154), window manager 60 closes one or more TCP windows of parent sessions in low priority list 74 or selected sessions list 76 (156) as well as one or more TCP windows of parent sessions in high priority list 72 (158).

Threshold monitor 56 periodically (e.g., every 5 seconds) determines whether memory utilization has dropped below a previously exceeded threshold. As memory utilization decreases and memory utilization crosses memory threshold values on the downside, threshold monitor 56 directs other RSM 12 components to pare the congestion control techniques described in this disclosure. For example, threshold monitor 56 may direct window manager 60 to re-open closed TCP windows for high priority session 72 when memory utilization drops below memory threshold 3.

By performing these techniques, RSM 12 may reduce or in some instances eliminate deadlock experienced by sessions 26, improve application processing throughput, allocate resources commensurate with session priority, and parallelize execution of multiple sessions 26 even during periods of congestion.

Figure 6A:
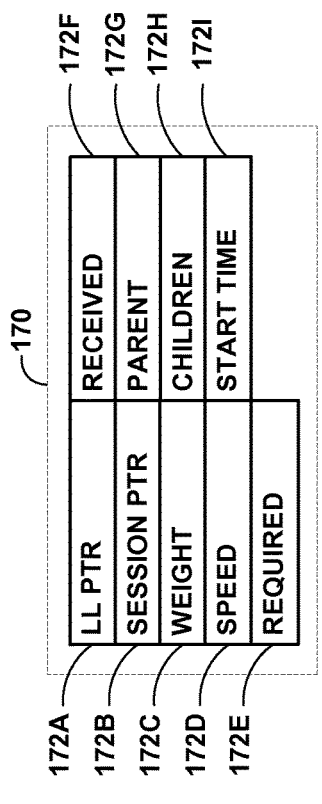
FIG. 6A is a block diagram illustrating an exemplary linked list session structure for performing the techniques of this disclosure.

FIG. 6A is a block diagram illustrating an exemplary linked list session structure 170 ("session structure 170") generated, maintained, and used by RSM 12 components to store references to sessions 26 in high priority list 72, low priority list 74, and selected sessions list 76 to perform the techniques of this disclosure. Session structure 170, in some embodiments, may be a table or database record, a tree node structure, or some other structure.

Session structure 170 includes fields 172A-172I to store information used by various RSM 12 components. Field 172A ("LL PTR") stores a linked list reference (e.g., a pointer) to a next session structure in one of the priority lists or in selected sessions list 76, or to null if a session structure instance terminates the respective list. Field 172B ("SESSION PTR") stores a reference (e.g., a pointer) to a corresponding session in sessions 26. RSM 12 modules dereference the value of field 172B to obtain the corresponding session structure to, for example, close the TCP window for the corresponding session.

Fields 172C-172F store values that relate to calculating and storing a weight for the corresponding session. Field 172C ("WEIGHT") stores a calculated weight for the session that is packet-driven, i.e., is updated by weight calculator 64 as UTM device 10 receives packets for the referenced session. Field 172D ("SPEED") stores a session speed, as determined by weight calculator 64, for the referenced session. Field 172E ("REQUIRED") stores the size of the memory buffer space needed to process the referenced session. Field 172F ("RECEIVED") stores the amount of data for the referenced session heretofore received by UTM device 10. As described in detail above, weight calculator 64 may determine a weight according to the formula W=(required−received)/speed.

Relationship manager 66 uses fields 172G ("PARENT") and 172H ("CHILDREN") to denote relationships among sessions 26. Field 172G stores a reference to parent session, if any, for the corresponding session referenced by the sessions structure 170 instance. Field 172H stores a list of references (using, for example, a linked list) to children, if any, of the corresponding session referenced by the sessions structure 170 instance.

Progress monitor 56 monitors a value in field 172I ("START TIME") to ensure a corresponding referenced session is receiving data and processing with a predetermined time interval. Field 172I stores an initial time for the session (e.g, a system time) that may represent a time at which selection module 50 selects the session for placement in selected sessions list 76, a time at which the session is assigned to high priority list 72 or low priority list 74, or a time at which the session begins a new transaction. If progress monitor 56 determines from the value in field 172I that the session has failed to complete in a predetermined, allotted time, progress monitor 56 aborts the session. Allotted times may differ for different lists. For example, a session referenced in selected sessions list 76 may have a shorter time in which to complete than a referenced in high priority list 74. In this way, new sessions may be selected earlier to speed congestion reduction techniques. If progress monitor 56 determines that TCP proxy 24 has received all data for the current transaction for a session referenced in selected sessions list 76, progress monitor 56 may direct selection module 50 to return the parent session for the child session to the appropriate priority list. Selection module 50 first waits a predetermined time interval to ensure receipt of additional control or other dependency information for the corresponding application, then returns the parent session to the priority list.

Figure 6B:
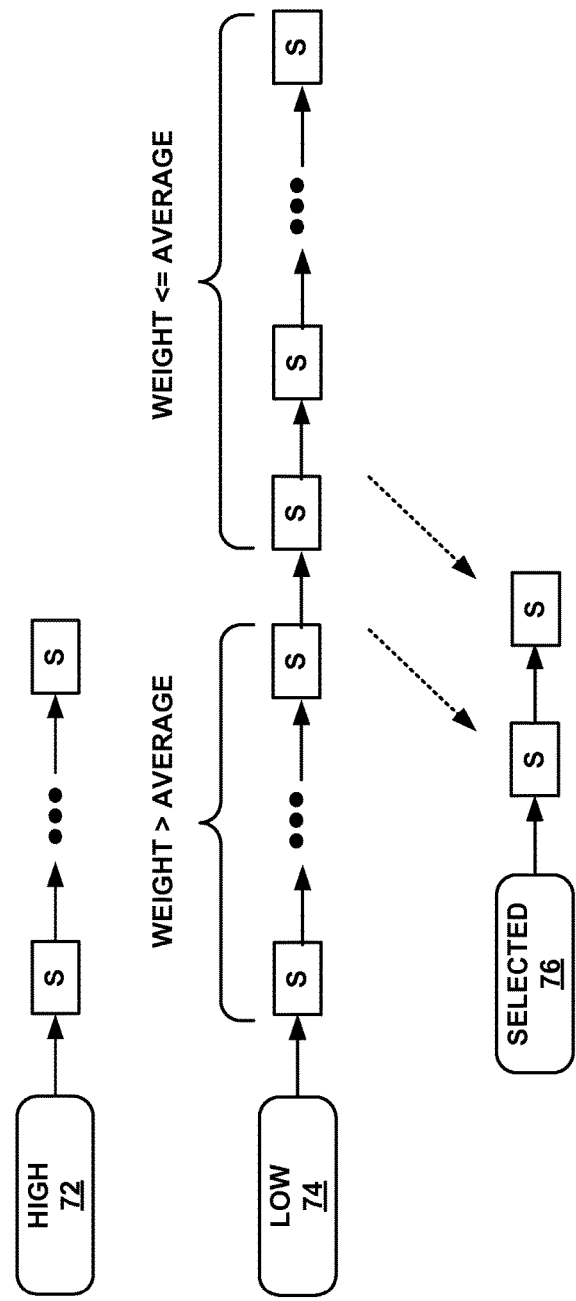
FIG. 6B illustrates priority list and selection session list data structures used by the exemplary resource scheduling module of FIG. 3 to perform the techniques of this disclosure.

FIG. 6B illustrates high priority list 72, low priority list 74, and selected sessions list 76 in further detail. Each of the lists is a linked list that comprises zero or more session structure 170 instances. The illustrated examples illustrate the lists in a state after selection module 50 performs a selection process, according to the techniques of this disclosure, on low priority list 74. Selection module 50 selects two session references, represented by two session structure 170 instances, and transfers the selected references to selected sessions list 76. The selected sessions have weight less than the average weight of low priority list 74 at the instant of their respective selection. In addition, the selected sessions expect remaining data for their respective current transaction that is less than the available reserve buffer 42 at the instant of their respective selection. During the selection process, selection module 50 segregates sessions remaining in low priority list 74 by the relation of the respective session weight to an average weight of sessions referenced by the list. Sessions having a weight less than or equal to average occupy the end of low priority list 74.

Figure 7:
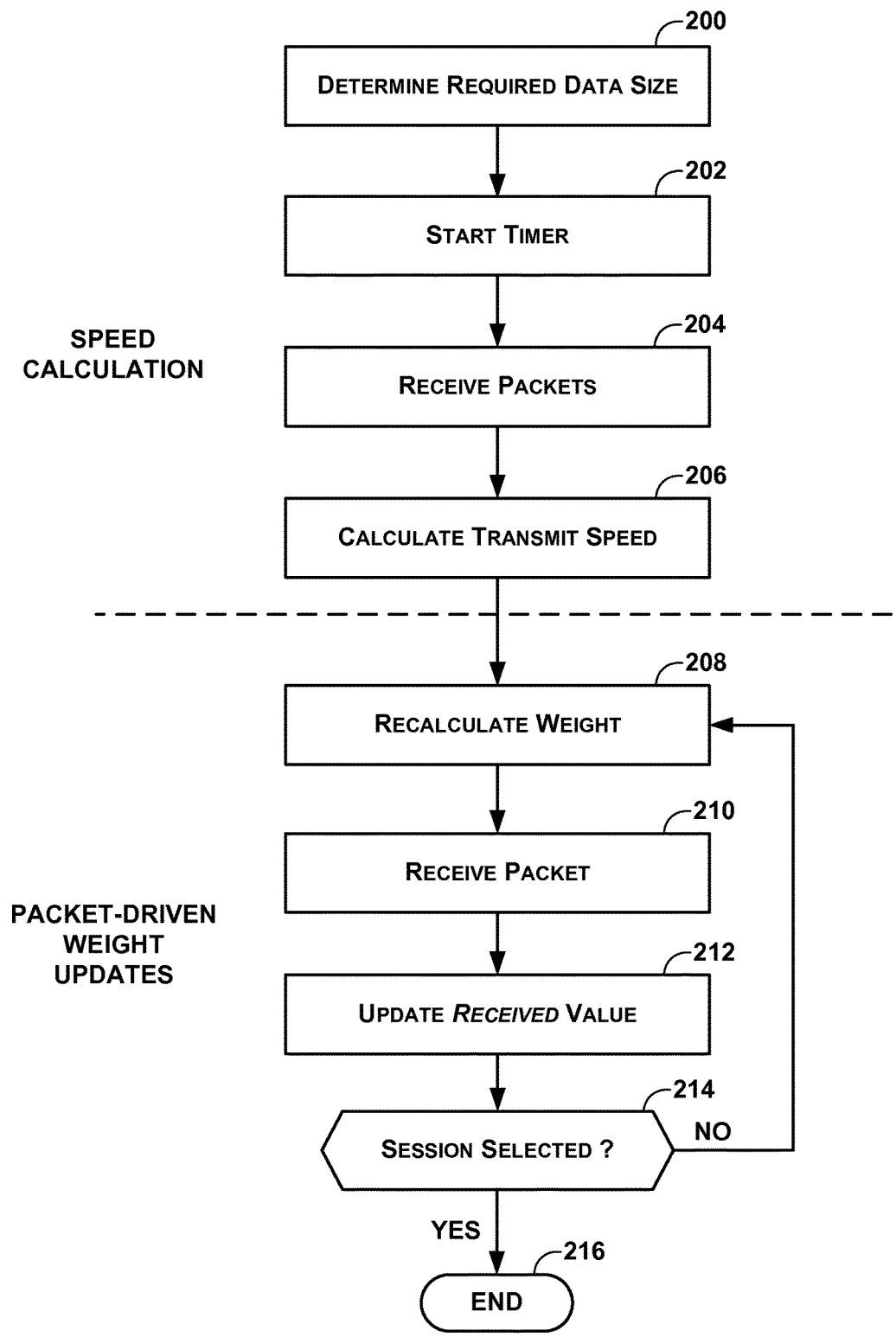
FIG. 7 is a flowchart illustrating an exemplary operation of the resource scheduler module of FIG. 3 to perform packet-driven session weight updates in accordance with techniques herein described.

FIG. 7 is a flowchart illustrating an exemplary operation of weight calculator 64 and proxy interface 62 to perform packet-driven session weight updates in accordance with techniques herein described. To calculate a session weight, weight calculator 64 requires a transmit speed value. When TCP proxy 24 instantiates a session, it sends a message to proxy interface 62 of RSM 12 to add a reference to the new session in a priority list. Proxy interface 62 creates a session structure 170 instance to reference the new session and determines a required data size for the session from, e.g., application processor 22 (200). Weight calculator 64 starts a timer for the session to provide a speed interval for calculation (202). As TCP proxy 24 receives application-layer data for the session, proxy interface 62 updates the total received amount of data for the session (204). When the timer expires, weight calculator 64 determines the average transmit speed for the session as the quotient of the total received amount of data for the session and the timer interval (206).

Thereafter, weight calculator 64 recalculates the session weight (208) as TCP proxy 24 receives application-layer session data in packets (210). TCP proxy 24 directs proxy interface 62 to update the total amount of data received for the session after receiving a packet containing session data (212). If selection module 50 selects a session for placement in selected sessions list 76 (YES branch of 214), weight calculator 64 eschews further weight updates (216).

FIGS. 8A-8B illustrate tables 220 and 222, respectively, list experimental data that illustrates contrasting performances of the techniques of this disclosure when tested against conventional techniques. In particular, table 220 includes a record ("RSM") for a performance of a device that comprises an embodiment of RSM 12 and a record for a device that performs conventional techniques ("conventional techniques") in response to a performance test. For the test, each of the devices was loaded with multiple simultaneous HTTP application sessions for processing (specifically, transactions involving an HTTP GET transfer of a large file). The "Throughput" column of table 220 provides a resulting average throughput for the described techniques and a conventional technique for the performance test, respectively. Table 220 shows an improved throughput for the RSM 12 device. Average throughput is defined as (total number of successful transactions*file size)/test duration.

The "Success Rate" column of table 220 provides a resulting success rate for the respective techniques. Success rate is defined as (number of successful transactions/total number of transactions)*100%. Table 220 shows an improved success rate for the device operating according to the techniques of this disclosure. The "Actual Transaction Success Rate" column of table 220 includes values for the respective techniques, where the values are calculated as (total number of transactions/number of transactions attempted)*100%. As shown, the techniques of this disclosure reduce starvation and thus improve the success rate of a device operating accordingly.

Table 222 of FIG. 8B includes a record ("RSM") for a performance of a device that comprises an embodiment of RSM 12 and a record for a device that performs conventional techniques ("conventional techniques") in response to an FTP-based performance test. For the test, each of the devices was loaded with multiple simultaneous FTP applications for processing (specifically, transactions involving a transfer of a large file). As with the HTTP-based performance test, the device operating in accordance with the described techniques has improved throughput and success rate when compared to a device operating according to conventional techniques.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
intercepting, with a network security device that applies a security service to a plurality of sessions, inbound packets that include application-layer data for the plurality of sessions;
processing, with the network security device and for each session of the plurality of sessions, the inbound packets for the session to determine an expected receipt time for remaining application-layer data to be received by the network security device for a current transaction for the session;
determining a weight for each session of the plurality of sessions, wherein the weight for each session of the plurality of sessions is correlative to the expected receipt time for the session;
calculating, with the network security device, an average weight for the plurality of sessions based on the weight for each of the plurality of sessions;
selecting a first session from the plurality of sessions based on a determination that the first session has a weight that is less than or equal to the average weight for the plurality of sessions;
allocating additional memory resources of the network security device to store additional application-layer data received in additional inbound packets for the selected first session; and
preventing allocation of additional memory resources to unselected sessions in the plurality of sessions until the first session terminates.

2. The method of claim 1, wherein the selected first session uses a Transport Control Protocol (TCP) connection to transport packets, and further comprising:
opening a TCP window for the selected first session,
wherein preventing allocation of memory resources to unselected sessions in the plurality of sessions comprises closing a TCP window for each of the unselected sessions.

3. The method of claim 1, further comprising:
selecting a second session from the plurality of sessions based on a determination the second session has a weight that is less than or equal to the average weight for the plurality of sessions;

allocating additional memory resources of the network security device to store additional application-layer data received in additional inbound packets for the selected second session;
applying the security service to the selected first session and the selected second session concurrently; and
preventing allocation of additional memory resources to unselected sessions in the plurality of sessions until the second session terminates.

4. The method of claim 3, further comprising reserving a reserve memory resource buffer in a main memory of the network security device, wherein allocating additional memory resources comprises allocating a first portion of the reserve memory resource buffer to the first session and allocating a second portion of the reserve memory resource buffer to the second session.

5. The method of claim 1, further comprising:
assigning each of the plurality of sessions a priority according to a set of one or more priority rules stored by the network security device, wherein the selected first session is assigned a first priority; and
opening a TCP window for the selected first session,
wherein preventing allocation of memory resources to unselected sessions comprises closing a TCP window for each of the unselected sessions in the plurality of sessions assigned the first priority and maintaining an open TCP window for each of the unselected sessions in the plurality of sessions assigned a priority other than the first priority.

6. The method of claim 1, wherein determining a weight for each of plurality of sessions comprises:
determining a respective transmit speed, speed, of each session;
determining a required buffer size, required, for each session;
determining an amount of application-layer data, received, heretofore received by the network security device for each session; and
calculating the respective weight for each session according to the formula:

(required−received)/speed.

7. The method of claim 1, further comprising:
determining the first session is related to a second one of the plurality of sessions as a child of the second session;
selecting the second session only after selecting the first session;
allocating additional memory resources of the network security device to store additional application-layer data received in additional inbound packets for the selected second session; and
preventing allocation of additional memory resources to unselected sessions in the plurality of sessions until the second session terminates.

8. The method of claim 7, wherein selecting the second session only after selecting the first session further comprises waiting a predetermined time interval after selecting the first session and, after waiting the predetermined time interval, opening a TCP window for the second session.

9. The method of claim 1, further comprising:
assigning each of the plurality of sessions a high priority or a low priority according to a set of one or more priority rules stored by the network security device for applications transported by the sessions;
reserving a reserve memory resource buffer from a memory of the network security device;
selecting, based on the calculated weights for the sessions, only a subset of the low priority sessions when a memory resource utilization value for the network security device surpasses a first threshold value;
after selecting only the subset of low priority sessions, storing additional application-layer data received in additional inbound packets for the selected low priority sessions without utilizing the reserve memory resource buffer when the memory resource utilization value is below a second threshold value; and
allocating portions of the reserve memory resource buffer to the selected low priority sessions to store additional application-layer data received in additional inbound packets for the selected low priority sessions when the memory resource utilization value surpasses the second threshold value.

10. The method of claim 9, wherein preventing allocation of memory resources to unselected sessions in the plurality of sessions comprises, after selecting only the subset of low priority sessions, closing a TCP window for each of the unselected sessions that is assigned a low priority.

11. The method of claim 9, further comprising:
selecting only a subset of high priority sessions without selecting the low priority sessions when the memory resource utilization value for the network security device surpasses a third threshold value and the selected low priority sessions terminate;
after selecting only the subset of high priority sessions, storing additional application-layer data received in additional inbound packets for the selected high priority sessions without utilizing the reserve memory resource buffer when the memory resource utilization value is below a fourth threshold value; and
allocating portions of the reserve memory resource buffer to the selected high priority sessions to store additional application-layer data received in additional inbound packets for the selected high priority sessions when the memory resource utilization value surpasses the fourth threshold value.

12. The method of claim 11, wherein preventing allocation of memory resources to unselected sessions in the plurality of sessions comprises, after selecting only the subset of high priority sessions, closing a TCP window for each of the unselected sessions that is assigned a high priority.

13. The method of claim 9, further comprising aborting selected low priority sessions when the memory resource utilization value surpasses a third threshold value.

14. The method of claim 9, further comprising preventing allocation of additional memory resources to a second session when the second session is related to the selected first session as a parent of the selected first session and when the memory resource utilization value surpasses a third threshold value.

15. The method of claim 1, further comprising:
selecting an additional first subset of sessions from the plurality of sessions, wherein each session in the first subset has a weight less than or equal to the average weight for the plurality of sessions; and
allocating additional memory resources of the network security device to store additional application-layer data received for the first subset.

16. The method of claim 15, further comprising:
reserving a reserve memory resource buffer;
determining a total amount of remaining application-layer data to be received by the network security device for the respective current transactions for the first subset and the selected first session; and when the total amount of remaining application-layer data is less than the size of the reserve memory buffer, selecting an additional second subset of sessions from the plurality of sessions and allocating additional memory resources to store additional application-layer data received for the second subset.

17. The method of claim 1, further comprising:

assigning each of the plurality of sessions a high priority list or a low priority list according to a set of one or more priority rules stored by the network security device for applications transported by the sessions; and upon reaching, according to a memory utilization of the network security device, each of a plurality of predefined memory thresholds that signify respective memory utilization values by the network security device, applying different resource scheduling mechanisms to the sessions assigned to the high priority list and to the sessions assigned to the low priority list.

18. A network security device that applies a security service to a plurality of sessions, the network security device comprising:

a transmission control protocol (TCP) proxy configured to intercept inbound packets that include application-layer data for the plurality of sessions;

a weight calculator to process, for each session of the plurality of sessions, the inbound packets for the session to determine an expected receipt time for remaining application-layer data to be received by the network security device for a current transaction for the session and to determine a weight for the session, wherein the weight for the session is correlative to an expected receipt time for remaining application-layer data to be received by the network security device for a current transaction for the session, wherein the weight calculator calculates an average weight for the plurality of sessions based on the weight for each of the plurality of sessions;

an application processor to apply the security service to the plurality of sessions;

a selection module to select a first session from the plurality of sessions based on a determination that the first session has a weight that is less than or equal to the average weight for the plurality of sessions; and a buffer manager to allocate additional memory resources of the network security device to store additional application-layer data received in additional inbound packets for the selected first session, wherein the buffer manager prevents allocation of additional memory resources to unselected sessions in the plurality of sessions until the first session terminates.

19. The network security device of claim 18, wherein the selected first session uses a Transport Control Protocol (TCP) connection to transport packets, and further comprising:

a window manager to open a TCP window for the selected first session, wherein preventing allocation of memory resources to unselected sessions in the plurality of sessions comprises closing, with the window manager, a TCP window for each of the unselected sessions.

20. The network security device of claim 18, wherein the selection module selects a second session from the plurality of sessions based on a determination the second session has a weight that is less than or equal to the average weight for the plurality of sessions, wherein the buffer manager allocates additional memory resources of the network security device to store additional application-layer data received in additional inbound packets for the selected second session, wherein the application processor applies the security service to the selected first session and the selected second session concurrently, and wherein the buffer manager prevents allocation of additional memory resources to unselected sessions in the plurality of sessions until the second session terminates.

21. The network security device of claim 20, wherein the buffer manager reserves a reserve memory resource buffer in a main memory of the network security device, and wherein the buffer manager allocates additional memory resources by allocating a first portion of the reserve memory resource buffer to the first session and allocating a second portion of the reserve memory resource buffer to the second session.

22. The network security device of claim 18, further comprising:

a proxy interface to assign each of the plurality of sessions a priority according to a set of one or more priority rules stored by the network security device, wherein the selected first session is assigned a first priority; and a window manager to open a TCP window for the selected first session, wherein the window manager closes a TCP window for each of the unselected sessions in the plurality of sessions assigned the first priority and maintaining an open TCP window for each of the unselected sessions in the plurality of sessions assigned a priority other than the first priority.

23. The network security device of claim 18, wherein the TCP proxy determines a respective transmit speed, speed, of each session, wherein the TCP proxy determines a required buffer size, required, for each session, wherein the TCP proxy determines an amount of application-layer data, received, heretofore received by the network security device for each session, and wherein the weight calculator calculates the respective weight for each session according to the formula:

(required−received)/speed.

24. The network security device of claim 18, further comprising:

a relationship manager to determine the first session is related to a second one of the plurality of sessions as a child of the second session, wherein the selection module selects the second session only after selecting the first session, wherein the buffer manager allocates additional memory resources of the network security device to store additional application-layer data received in additional inbound packets for the selected second session, and wherein the buffer manager prevents allocation of additional memory resources to unselected sessions in the plurality of sessions until the second session terminates.

25. The network security device of claim 24, further comprising:

a window manager, wherein the selection module selects the second session only after selecting the first session by waiting a predetermined time interval after selecting the first session and, after waiting the predetermined time interval, directing the window manager to open a TCP window for the second session.

26. The network security device of claim 18, further comprising:
a proxy interface to assign each of the plurality of sessions a high priority or a low priority according to a set of one or more priority rules stored by the network security device for applications transported by the sessions; and
a threshold monitor to monitor a memory resource utilization value of a memory resource of the network security device,
wherein the buffer manager reserves a reserve memory resource buffer from a memory of the network security device,
wherein the selection module selects, based on the calculated weights for the sessions, only a subset of the low priority sessions when the memory resource utilization value surpasses a first threshold value,
wherein, after selecting only the subset of low priority sessions, the TCP proxy stores additional application-layer data received in additional inbound packets for the selected low priority sessions without utilizing the reserve memory resource buffer when the memory resource utilization value is below a second threshold value, and
wherein the buffer manager allocates portions of the reserve memory resource buffer to the selected low priority sessions to store additional application-layer data received in additional inbound packets for the selected low priority sessions when the memory resource utilization value surpasses the second threshold value.

27. The network security device of claim 26, further comprising:
a window manager,
wherein the buffer manager prevents allocation of memory resources to unselected sessions in the plurality of sessions by, after selecting only the subset of low priority sessions, directing the window manager to close a TCP window for each of the unselected sessions that is assigned a low priority.

28. The network security device of claim 26,
wherein the selection module selects only a subset of high priority sessions without selecting the low priority sessions when the memory resource utilization value for the network security device surpasses a third threshold value and the selected low priority sessions terminate,
wherein, after selecting only the subset of high priority sessions, the TCP proxy stores additional application-layer data received in additional inbound packets for the selected high priority sessions without utilizing the reserve memory resource buffer when the memory resource utilization value is below a fourth threshold value, and
wherein the buffer manager allocates portions of the reserve memory resource buffer to the selected high priority sessions to store additional application-layer data received in additional inbound packets for the selected high priority sessions when the memory resource utilization value surpasses the fourth threshold value.

29. The network security device of claim 28, further comprising:
a window manager,
wherein, to prevent allocation of memory resources to unselected sessions in the plurality of sessions, the selection module, after selecting only the subset of high priority sessions, directs the buffer manager to close a TCP window for each of the unselected sessions that is assigned a high priority.

30. The network security device of claim 26, wherein the selection module aborts selected low priority sessions when the memory resource utilization value surpasses a third threshold value.

31. The network security device of claim 26, further comprising:
a relationship manager to determine whether a second one of the plurality of sessions is related to the selected first session as a parent of the selected first session,
wherein the buffer manager prevents allocation of additional memory resources to the second session when the second session is related to the selected first session as a parent of the selected first session and when the memory resource utilization value surpasses a third threshold value.

32. The network security device of claim 18,
wherein the buffer manager reserves a reserve memory resource buffer,
wherein the selection module selects an additional first subset of sessions from the plurality of sessions, wherein each session in the first subset has a weight less than or equal to the average weight for the plurality of sessions, and
wherein the buffer manager allocates portions of the reserve memory resource buffer to store additional application-layer data received for the first subset.

33. The network security device of claim 32, further comprising:
a proxy interface,
wherein the buffer manager reserves a reserve memory resource buffer,
wherein the proxy interface determines a total amount of remaining application-layer data to be received for the respective current transactions for the first subset and the selected first session, and
when the total amount of remaining application-layer data is less than the size of the reserve memory buffer, the selection module selects an additional second subset of sessions from the plurality of sessions and the buffer manager allocates portions of the reserve memory resource buffer to store additional application-layer data received for the second subset.

34. A computer-readable storage medium comprising instructions to cause a programmable processor to:
intercept, with a network security device that applies a security service to a plurality of sessions, inbound packets that include application-layer data for the plurality of sessions;
process, with the network security device and for each session of the plurality of sessions, the inbound packets for the session to determine an expected receipt time for remaining application-layer data to be received by the network security device for a current transaction for the session;
determine a weight for each of the plurality of sessions, wherein the weight for each session of the plurality of sessions is correlative to the expected receipt time for the session;
calculate, with the network security device, an average weight for the plurality of sessions based on the weight for each of the plurality of sessions;

select a first session from the plurality of sessions based on a determination the first session has a weight that is less than or equal to the average weight for the plurality of sessions;

allocate additional memory resources of the network security device to store additional application-layer data received in additional inbound packets for the selected first session; and prevent allocation of additional memory resources to unselected sessions in the plurality of sessions until the first session terminates.

35. The computer-readable storage medium of claim 34, wherein the instructions further cause the programmable processor to:

select a second session from the plurality of sessions when a weight of the second session is less than or equal to the average weight for the plurality of sessions;

allocate additional memory resources of the network security device to store additional application-layer data received in additional inbound packets for the selected second session;

apply the security service to the selected first session and the selected second session concurrently; and prevent allocation of additional memory resources to unselected sessions in the plurality of sessions until the second session terminates.

* * * * *